(12) United States Patent
Lecomte et al.

(10) Patent No.: US 10,527,291 B2
(45) Date of Patent: Jan. 7, 2020

(54) GLASS-CERAMIC ARTICLE AND ENAMEL SUITABLE FOR THE COATING THEREOF

(71) Applicant: EUROKERA S.N.C., Chateau Thierry (FR)

(72) Inventors: Emmanuel Lecomte, Nesles la Montagne (FR); Marie-Helene Rouillon, Chateau-Thierry (FR); Caroline Faillat, Belleau (FR); Pablo Vilato, Paris (FR); Bertrand Baret, Montmagny (FR)

(73) Assignee: EUROKERA S.N.C., Chateau Thierry (FR)

( * ) Notice: Subject to any disclaimer, the term of this patent is extended or adjusted under 35 U.S.C. 154(b) by 1185 days.

(21) Appl. No.: 14/766,920

(22) PCT Filed: Feb. 10, 2014

(86) PCT No.: PCT/FR2014/050242
§ 371 (c)(1),
(2) Date: Aug. 10, 2015

(87) PCT Pub. No.: WO2014/122409
PCT Pub. Date: Aug. 14, 2014

(65) Prior Publication Data
US 2015/0369492 A1 Dec. 24, 2015

(30) Foreign Application Priority Data

Feb. 11, 2013 (FR) ...................................... 13 51116

(51) Int. Cl.
| | | |
|---|---|---|
| *F24C 15/04* | (2006.01) |
| *C03C 8/04* | (2006.01) |
| *C03C 3/093* | (2006.01) |
| *C03C 17/04* | (2006.01) |
| *C03C 10/00* | (2006.01) |

(52) U.S. Cl.
CPC .............. *F24C 15/04* (2013.01); *C03C 3/093* (2013.01); *C03C 8/04* (2013.01); *C03C 10/0027* (2013.01); *C03C 17/04* (2013.01)

(58) Field of Classification Search
CPC ....... C03C 8/04; F24C 15/04; C04B 41/5022; C04B 41/5023; H01B 3/74; H01B 5/74
See application file for complete search history.

(56) References Cited

U.S. PATENT DOCUMENTS

| | | | | |
|---|---|---|---|---|
| 6,911,408 B2* | 6/2005 | Beunet | .................... | C03C 3/093 501/14 |
| 7,393,801 B2* | 7/2008 | Beunet | .................... | C03C 3/093 501/17 |
| 8,673,461 B2* | 3/2014 | Pelletier | .................. | C03C 3/085 428/426 |
| 8,986,841 B2* | 3/2015 | Pelletier | .................. | C03C 3/085 427/331 |
| 2003/0148868 A1 | 8/2003 | Beunet et al. | | |
| 2005/0090376 A1 | 4/2005 | Beunet et al. | | |
| 2010/0273631 A1 | 10/2010 | Pelletier et al. | | |
| 2014/0193627 A1* | 7/2014 | Pelletier | .................. | C03C 3/085 428/220 |
| 2016/0376190 A1* | 12/2016 | Karagoez | .............. | C03C 17/002 427/508 |

FOREIGN PATENT DOCUMENTS

| | | |
|---|---|---|
| FR | 2 826 955 | 1/2003 |
| FR | 2 926 544 | 7/2009 |

OTHER PUBLICATIONS

International Search Report dated May 9, 2014 in PCT/FR2014/050242 Filed Feb. 10, 2014.

* cited by examiner

*Primary Examiner* — Karl E Group

(74) *Attorney, Agent, or Firm* — Oblon, McClelland, Maier & Neustadt, L.L.P.

(57) ABSTRACT

The present invention relates to a glass-ceramic article at least partly coated with at least one layer of an enamel formed from a glass frit having the following composition, the proportions being expressed as weight percentages:

| | |
|---|---|
| $SiO_2$ | 50-66% and preferably $50 < SiO_2 \leq 65\%$ |
| $MgO$ | 3-8% and preferably 3-6% |
| $Na_2O$ | 7-15% |
| $K_2O$ | $\leq 3\%$ |
| $Li_2O$ | $\leq 3\%$, in particular $\leq 2\%$ |
| $CaO$ | $\leq 1\%$ |
| $BaO$ | $>0$-15% and preferably 5-15% |
| $Al_2O_3$ | 3-20% and preferably $3 < Al_2O_3 < 20\%$ |
| $ZrO_2$ | 0-4%, preferably $0 < ZrO_2 < 4\%$, in particular 0.5-2% |
| $ZnO$ | $>0$-5% |
| $B_2O_3$ | $>0$-6% and preferably $0 < B_2O_3 \leq 5\%$ | the sum of the alkaline-earth metal oxides CaO+BaO moreover being between 8 and 15%, and the sum of the alkali metal oxides $Na_2O+K_2O+Li_2O$ moreover being between 7 and 20%. The invention also relates to the reinforced glass-ceramics obtained.

9 Claims, No Drawings

GLASS-CERAMIC ARTICLE AND ENAMEL SUITABLE FOR THE COATING THEREOF

The present invention relates to an article (substrate, product) made of glass-ceramic, in particular a glass-ceramic plate, intended, for example, for covering or accommodating heating elements, such as for example a hob, an oven door, or a chimney insert, or a fire screen, etc., to a process for obtaining said article, and to a novel enamel composition suitable for the coating thereof.

Sales of articles such as glass-ceramic hobs have been continuing to grow over the last few years This success is explained in particular by the attractive appearance of such hobs and by the ease of cleaning them.

It will be recalled that a glass-ceramic is originally a glass, called precursor glass (or mother glass or green glass), the specific chemical composition of which allows controlled crystallization to be induced by suitable heat treatments, called ceramization. This partly crystallized specific structure gives the glass-ceramic unique properties.

At the present time, there are various types of glass-ceramic plate, each variant being the result of extensive research and many tests, given that it is very difficult to make modifications to these plates and/or to the process for obtaining them without risking an unfavorable effect on the desired properties. In particular, to be able to be used as a hob, a glass-ceramic plate must generally have a transmission in the wavelengths of the visible range that is both low enough to mask at least some of the subjacent heating elements when not in use and high enough so that, depending on the case (radiant heating, induction heating, etc.), the user can, for the sake of safety, visually detect the heating elements when they are in operation and/or can, where appropriate, read the displays. It must also have a high transmission in the wavelengths of the infrared range, especially in the case of hobs with radiant burners.

The glass-ceramic plates must also have a sufficient mechanical strength as demanded in their field of use (for example, in accordance with the EN 60335-2-6 standard for hobs in the field of household electrical goods). In particular, in order to be able to be used as hobs, the glass-ceramic plates must have sufficient resistance to the pressure and to the shocks that may arise (support and dropping of utensils, etc.). Generally, the glass-ceramic plates alone have a mechanical strength that is expressed in particular by a scale factor (defined below) between 150 and 180 MPa.

Most current plates are of dark color, in particular black, but there are also plates of lighter color (in particular white having, for example, a haze of at least 50%, as described in patent FR 2 766 816), or even transparent plates provided with opacifying coatings. Among known (functional and/or decorative) coatings for glass-ceramic plates, there are conventionally enamels, based on glass frits and pigments, and certain paints resistant to high temperature, based for example on alkyd resins. In particular, enamels have the advantage of being able to be deposited on the precursor glass (or mother glass or green glass) before ceramization and of being able to be baked during the ceramization, and also have the advantage of being able to withstand high temperatures (allowing the use of various heating means for the plate). However, they have the drawback of generally permitting only a single deposition (no enamel superposition is possible) and with a small thickness, otherwise there is a risk in particular of the enamel flaking off and of mechanically damaging the glass-ceramic plate. As regards paint, this may be applied (if so required) as several layers. However, it must be applied after ceramization (and therefore requires an additional baking operation) and remains limited to plates for induction burners (operating at lower temperature).

Glass-ceramic plates have also been proposed with coatings based on reflective layers deposited by magnetron sputtering or based on glass batch materials incorporating special-effect pigments (aluminum oxide or mica flakes coated with metal oxides). However, the coatings based on layers deposited by magnetron sputtering are more expensive since they require a specific installation and are generally limited to plates for induction burners, and their manufacture, carried out after ceramization, is more complex or tricky. As regards coatings based on a glass batch with special effect pigments, they have the same drawbacks as the abovementioned enamels.

More recently, an attempt has been made to develop novel enamels which make it possible to minimize the impact of the enamel on the mechanical strength of the baked enamel/glass-ceramic combination, for example compositions suitable for the most widespread dark glass-ceramic plates called "arsenic-refined" (that is to say, obtained from a mother glass comprising arsenic oxide at contents, for example, of around 0.5% to 1.5% by weight), the compositions developed being in particular based on a glass frit formed of $SiO_2$ (present, for example, at 60.5% by weight of the frit), of MgO (present, for example, at 4% by weight), of $Na_2O$ (present, for example, at 9.5% by weight), of $Li_2O$ (for example at 5% by weight), of BaO (for example at 10% by weight), of $ZrO_2$ (for example 2% by weight), of ZnO (for example at 4% by weight) and of $B_2O_3$ (for example at 5% by weight). However, these compositions are not suitable for all the applications, these compositions being, for example, used essentially as lower face of the hobs due to their low tear resistance. Furthermore, the novel formulations of glass-ceramic substrates developed in order to make possible arsenic-free refining (with a particular an arsenic oxide content of zero or less than 0.1%, it being possible for the arsenic to present problems in terms of health and safety) have resulted in a modification to the interaction with the baked enamel, embrittling much more the baked enamel/glass-ceramic combination and requiring the development of other more suitable solutions/formulations.

The object of the present invention was to provide improved novel glass-ceramic articles (such as plates), in particular to develop an enamel more suitable for the coating of different glass-ceramics, this enamel embrittling the glass-ceramic as little as possible, in particular for novel glass-ceramic substrates refined without arsenic, while having an improved delamination strength.

The present invention thus relates to a novel glass-ceramic article (or substrate), such as a plate, and a novel enamel for glass-ceramics, said article being at least partly coated with at least one layer of said enamel, this enamel comprising one (or being formed of one or from one) glass frit having the following (weight) composition, the proportions being expressed as weight percentages (composition expressed as weight percentages of oxides or else percentages by weight, based on the oxides, the constituents commonly being in this form in the enamel compositions):

| | |
|---|---|
| $SiO_2$ | 50-66% and preferably $50 < SiO_2 \leq 65\%$ |
| MgO | 3-8% and preferably 3-6% |
| $Na_2O$ | 7-15% |
| $K_2O$ | $\leq 3\%$ |
| $Li_2O$ | $\leq 3\%$, in particular $\leq 2\%$ |
| CaO | $\leq 1\%$ |

-continued

| | |
|---|---|
| BaO | >0-15% and preferably 5-15% |
| $Al_2O_3$ | 3-20% and preferably 3 < $Al_2O_3$ < 20% |
| $ZrO_2$ | 0-4%, preferably 0 < $ZrO_2$ < 4%, in particular 0.5-2% |
| ZnO | >0-5% |
| $B_2O_3$ | 0-6% and preferably 0 < $B_2O_3$ ≤ 5% | the sum of the alkaline-earth metal oxides CaO+BaO moreover being between 8 and 15%, and preferably between 8 and 12%, and the sum of the alkali metal oxides $Na_2O$+$K_2O$+$Li_2O$ moreover being between 7 and 20%, in particular between 7 and 15%.

Preferably, the glass-ceramic article according to the invention is a glass-ceramic plate, intended, for example, for covering or accommodating at least one heating element, in particular intended to be used as a hob or as a wall (in particular a door or part of a door) of an oven, or as a chimney insert, or else as a fire screen.

The present invention relates simultaneously to the (mineral) glass having the composition defined above, used for the frit and that makes it possible to produce the improved enamel and article according to the invention, the enamel thus produced, having a composition that (initially) contains the particles (or frit) of said glass, and also in its form obtained by baking said composition, and the glass-ceramic article coated (usually over part or all of one face) with said enamel.

The present invention also relates to a process for manufacturing an article, in particular a plate according to the invention, in which the above composition is applied, for example by screen printing or enamel jet, to the precursor glass (or mother glass or green glass) article before ceramization, said composition being baked during the ceramization cycle, and/or in which the above composition is applied, for example by screen printing or enamel jet, to the glass-ceramic article after ceramization, then said composition is baked.

Advantageously, the glass-ceramic article, in particular the glass-ceramic plate, coated with the enamel according to the invention has a tensile strength at least of the same order as that of the conventional enameled plates in the case of the conventional arsenic-refined glass-ceramics (that is to say with a (mother glass with a) composition comprising of around 0.5% to 1.5% by weight of arsenic oxide, or even with a composition comprising 0.2 to 1.5% by weight of arsenic oxide), and a tensile strength with is significantly improved compared to that of the enamel plates in the case of the glass-ceramics refined without arsenic (that is to say, with a (mother glass with a) composition comprising less than 0.2% by weight, preferably less than 0.1% by weight, in particular a content of less than or equal to 0.05% by weight, of arsenic oxide). The tensile strength is measured using a ring-on-tripod bending test, on an enameled plate test specimen having dimensions of around 70 mm×70 mm (the thickness of the plate moreover generally being around 4 mm), the enameled face being elongated. The test specimen rests on three 9.5-mm diameter balls each positioned at the vertices of an equilateral triangle inscribed in a 40-mm diameter circle. A force is applied by pressing at the center (the load being isotropic in this region) of the test specimen with a 10-mm diameter ring. The rate of advance of the ring is around 5 mm/min. The results are interpreted using the Weibull model described in the following article: "A Statistical Theory of the Strength of Materials", Royal Swedish Institute For Engineering Research, W. Weibull, Stockholm 1939, 1-45. The data obtained revealing the average rupture stress is the data known as the "scale factor", expressed in MPa (this scale factor being, in other words, the result of the processing, by the Weibull method, of flexural modulus of rupture (MOR) measurements).

Thus, the glass-ceramic article, in particular the glass-ceramic plate, coated with the enamel according to the invention advantageously (in particular for the treated region) has a scale factor, obtained according to the Weibull model following a bending test, of at least 80 MPa, said factor possibly ranging up to 130 MPa at least, in the case where the glass-ceramic used is refined without arsenic, the scale factor obtained for one and the same glass-ceramic coated this time with a conventional enamel generally being much lower (in particular not exceeding 60 MPa). It is thus observed that the glass-ceramics obtained in the present invention are much less embrittled compared to those treated with conventional enamels.

Moreover, the glass-ceramic article coated with the enamel according to the invention advantageously has an improved delamination strength, in particular compared to the glass-ceramic articles coated with the reinforcing effect enamels recently developed, whether or not the glass-ceramic used is refined with arsenic. The delamination strength is generally measured by proceeding as follows: the enamel is deposited by screen printing in a form of random patterns of millimetric size on a precursor glass sheet and then baked during the ceramization or (is deposited) on a glass-ceramic plate and then baked subsequently (after the ceramization). When the enamel is baked subsequently, the baking is carried out at a temperature which allows the crystals to develop in the enamel, this temperature being chosen within the temperature range in which in particular a good coating and the formation of the crystals is observed, this temperature range generally lying between 700 and 900° C. for the enamels according to the invention. Generally and preferably, this temperature is greater than approximately 250 to 300° C., compared with the dilatometric softening temperature of the enamel (or more specifically of the glass/glass frit forming the enamel), and preferably corresponds to (or is located just at or inside) the exothermic peak for crystallization of the enamel.

After baking, two strips of adhesive tape (of "Scotch" type) with a width of 12 mm (and the length of which depends on the size of the patterns, it being possible for this length to range in particular up to 30 cm), such as that sold under the reference Transparent Tape 550 by 3M, are subsequently applied the one on the other to the enamel and removed together with a sharp move perpendicular to the surface. The glass-ceramic is subsequently observed under a microscope at a times 100 magnification, the grade 0 being assigned where there is no delamination, the grade 1 when there is less than one delamination per millimetric pattern, this delamination being small in size (less than 25% of the size of the pattern) compared to the size of the pattern, the grade 2 when there are from 1 to 3 delaminations per pattern, these delaminations being small in size (these combined delaminations representing less than 25% of the size of the pattern) compared to the size of the pattern, the grade 3 when there are from 3 to 5 delaminations per pattern (these combined delaminations representing less than 25% of the size of the pattern) compared to the size of the pattern, the grade 4 when there is on average 25% to 50% of the pattern delaminated, and the grade 5 when there is on average more than 50% of the pattern delaminated. The glass-ceramic article coated with the enamel according to the invention advantageously has a delamination strength grade of 0, corresponding to no delamination. The enamel according to the invention can thus advantageously be used on the upper face of the glass-ceramics.

The composition of the enamel according to the invention defined above will now be explained more precisely below. In this composition, the ranges defined for each of the components are paramount for obtaining the desired properties, respect for these ranges making it possible in particular to simultaneously guarantee the production of the frit at high temperature, good coating of the enamel on the substrate, the desired mechanical strength and the chemical resistance, etc.

As indicated above, the composition mentioned preferably comprises more than 3% of alumina $Al_2O_3$. Particularly preferably, it comprises more than 4% of alumina ($4<Al_2O_3<20\%$), in particular more than 5% of alumina ($5<Al_2O_3<20\%$), or even at least 7% of alumina ($7\leq Al_2O_3<20\%$), in advantageous embodiments according to the invention. Preferably again, it comprises more than 7% of alkali metal oxide $Na_2O$ ($7<Na_2O\leq 15\%$), in particular at least 8% of $Na_2O$ ($8\leq Na_2O\leq 15\%$). Preferably again, it comprises less than 13% of alkaline-earth metal oxide BaO ($0<BaO<13\%$, in particular $5<BaO<13\%$); it especially comprises at most 12% of BaO ($0<BaO\leq 12\%$, in particular $5<BaO\leq 12\%$). Preferably again, it comprises a low content of $Li_2O$, in particular of around 2% or less, or is devoid of $Li_2O$.

It should be noted that, besides the constituents mentioned above, the composition may, if necessary, contain other constituents (for example, in the form of traces linked to the degree of purity of the raw materials) in a limited amount (less than 5%, generally less than 2%, in particular less than 1%) as long as these constituents do not compromise the desired properties, the composition also advantageously being free of toxic metals such as lead, mercury, cadmium and hexavalent chromium.

It is surprisingly noted that the enamel according to the invention, based on the aforementioned glass frit, has an expansion coefficient (this coefficient being measured more accurately on the glass frit of the enamel, considered to be a glass) of at least $60\times 10^{-7}$ $K^{-1}$, in particular at least $75\times 10^{-7}$ or even at least $80\times 10^{-7}$ $K^{-1}$, i.e. much higher than that of the glass-ceramic substrate. To date, it was customary to search for enamels having very low expansion coefficients, close to that of the glass-ceramic substrate, the behavior of the enamel on the substrate being assumed to be proportionally worse when the difference between the expansion coefficients was high.

The enamel chosen according to the invention and the article, in particular the plate, coated with this enamel have good thermal resistance that is compatible with the use of various types of heaters (induction, radiant, halogen, gas, etc. heaters), are scratch and abrasion resistant and resistant to heat shocks, have good aging resistance and offer, where appropriate (in particular when the frit is combined with pigments and/or combined with another layer such as a layer of paint as explained below), an excellent compromise between the opacity commonly desired for enamels and the resistance to the various mechanical stresses to which the coated plates are subjected, the enamel affecting the mechanical strength of the glass-ceramics refined without arsenic on which the enamel is deposited less than conventional enamels, as desired according to the invention, while having a good delamination strength, as illustrated below.

From the process standpoint, the composition deposited does not differ from a conventional enamel and is completely compatible with existing production lines, in particular, it may be applied by screen printing using standard screen printing machines and fabrics. Compared with thin layers deposited by magnetron sputtering, it is more economical and, being electrically insulating, it may be used, with no particular adjustment, with touch-sensitive controls, usually capacitive touch-sensitive controls. It is also compatible with all types of heating (in particular it withstands the high temperatures, of up to 700° C., of the radiant heating elements, and is suitable for the magnetic fields of induction coils, etc.), unlike magnetron-sputtered paints and, where appropriate, layers generally reserved for certain types of heating. It may also be deposited in any region of the plate (including the heater regions), in particular unlike paints.

Besides the glass frit (or glass particles) having the composition explained previously, the enamel according to the invention may also comprise other components. Remember that enamels are generally formed (before application to the substrate and baking) from a powder comprising a glass frit (that has to form the glassy matrix) and pigments (as colorants in particular, these pigments possibly also being part of the frit), the frit and the pigments being based on metal oxides, and from a medium or "carrier" allowing the application and the prior adhesion of the enamel to a substrate.

The enamel according to the invention may thus comprise pigments, the content of pigment(s), added to the frit, in the assembly of frit(s)/pigment(s) of the enamel generally being between 5 and 40% by weight (relative to the assembly of frit(s)/pigment(s)), and preferably ranging from 10 to 35% by weight. The pigments for enamels may be chosen from compounds containing metal oxides such as chromium oxides, copper oxides, iron oxides, cobalt oxides, nickel oxides, zinc oxides, manganese oxides, cerium oxides, titanium oxides, or even based on alumina, etc. or may be chosen from copper chromates, cobalt chromates, etc. They are used as a function of the coloration and/or, where appropriate, the opacity that it is desired to obtain. One example of particularly suitable pigments for adding to the frit according to the invention is in particular a mixture of iron, chromium, copper, cobalt and nickel oxides, or a white pigment based on titanium oxide.

The glass frit and the pigments are conventionally in powder form before being suspended in a medium. The particle size distribution of the assembly of frit(s)/pigment(s) in powder form is generally chosen so that at least 90% by weight of the particles forming the powder have a diameter of less than 20 μm, advantageously less than 15 μm, in particular less than 10 μm, notably less than 5 μm (i.e. so that (the particles of) the frit(s)/pigment(s) assembly has or have a D90 less than 20 μm, advantageously less than 15 μm, in particular less than 10 μm, notably less than 5 μm).

The frit of the composition according to the invention is conventionally obtained by melting, at high temperature (more than 1000° C.) a mixture of suitable (natural or synthetic) raw materials. The frit is then milled (generally in a solvent, such as ethanol, that is then evaporated) in powder form, and if necessary pigments and/or opacifiers are added (before and/or after milling(s)). The pulverulent mixture (glass powder+pigments (and/or opacifiers)) obtained (and having, after milling(s) and/or other appropriate treatment(s), particles having on average diameter D90 less than 20 μm, advantageously less than 15 μm, in particular less than 10 μm, notably less than 5 μm) is, after evaporation if necessary of the milling solvent, subsequently suspended in a medium in order to obtain a composition (paste) capable of being deposited onto a substrate.

The enamel composition according to the invention, in its ready-to-deposit form, thus generally also comprises a medium allowing adjustment to the viscosity desired for application to the substrate and enabling binding with the substrate. This medium, chosen in order to ensure good suspension of the particles of frits and pigments and that must be consumed at the latest during the baking of the enamel, may be any medium or organic binder customarily used in the conventional enamel compositions and may in particular comprise solvents, diluents, oils such as pine oil and other plant oils, resins such as acrylic resins, petroleum fractions, film-forming substances such as cellulose substances, etc. The proportion of medium in the ready-to-deposit composition is preferably between 40 and 60% by weight of said composition, preferably between 45 and 55% by weight.

The enamel composition before deposition onto an article, such as a plate, is therefore generally in the form of a stable liquid-solid mixture, of pasty consistency, with a viscosity suitable for the deposition process (in particular by screen printing).

The layer of enamel deposited on the article or substrate, in particular the plate, according to the invention generally covers at least one part of one face of the article (in particular of the plate), and may cover the whole of said face (with the exception, where appropriate, of regions and/or of resists, intended for example for the reading of displays). The thickness of one layer of enamel after baking (whether the baking is carried out during the ceramization after deposition on the precursor glass, or is carried out subsequently after deposition on the glass-ceramic, as explained below) is from 1 to 10 µm, generally from 2 to 3.5 µm, in particular from 2 to 3 µm, the thickness of the glass-ceramic being, for example, of around 3-4 mm in the case of a plate. In the latter case too, the layer defined according to the invention may be deposited on the lower or upper face of the plate and is preferably deposited on the upper face.

The enamel according to the invention may be deposited as one or possibly more layers and/or be combined, where appropriate, with other layers and/or act as an underlayer to another layer, such as a layer of enamel (in particular of a different nature) or of paint, making it possible in particular depending on the case to increase the thicknesses and/or to juxtapose two types of decoration (one of the layers forming for example a base frame and the other forming a decoration or specific graphics) and/or to procure a greater opacity, etc.

The enamel may, for example, be used where appropriate with at least one layer of opacifying paint. The layer(s) of paint combined, where appropriate, with the enamel according to the invention are advantageously chosen so as to withstand high temperatures and to be stable with respect to their color and their cohesion with the plate, and so as not to affect the mechanical properties of the plate. They advantageously have a decomposition temperature above 350° C., are generally based on one or more resins (such as a silicone resin, in particular one modified by the incorporation of at least one alkyd resin, or a polyimide, polyamide, polyfluorinated and/or polysiloxane resin, such as the following resins: Dow Corning® 804, 805, 806, 808, 840, 249, 409 HS and 418 HS, Rhodorsil® 6405 and 6406 from Rhodia, Triplus® from General Electric Silicone and SILRES® 604 from Wacker Chemie GmbH, etc.), and, where appropriate, they are filled (for example with one or more pigments or colorants) and optionally diluted so as to adjust their viscosity, the diluent being, where appropriate, removed during their subsequent baking. The thickness of each paint layer may be between 1 and 100 microns (especially between 5 and 50 microns) and it may be applied by any suitable technique, such as brush deposition, doctor blade deposition, spraying, electrostatic deposition, dip coating, curtain coating, screen printing, etc. Generally, according to the invention, it is deposited by screen printing, where appropriate followed by drying.

Advantageously, the substrate, in particular the glass-ceramic plate, coated with the enamel (obtained after baking) according to the invention (the enamel if need be comprising pigments and/or being combined with a layer of paint, for example) has an opacity such that it makes it possible in particular to mask underlying elements. The opacity is evaluated where appropriate by measuring (colorimetry in reflection carried out using a Byk-Gardner Color Guide 45/0 colorimeter) the color variation $\Delta E^*$, corresponding to the difference between the color measured on the face of the substrate opposite the face bearing the enamel, for the substrate placed on an opaque white background and that for the substrate placed on an opaque black background ($\Delta E^* = ((L_B^* - L_N^*)^2 + (a_B^* - a_N^*)^2 + (b_B^* - b_N^*)^2)^{1/2}$ according to the equation established in 1976 by the CIE, $L_B^*, a_B^*, b_B^*$ being the colorimetric coordinates of the first measurement on a white background and $L_N^*, a_N^*, b_N^*$ being those of the second measurement on a black background). Advantageously, the glass-ceramic substrate coated with the enamel according to the invention has a $\Delta E^*$ value less than or equal to 0.5, preferably less than or equal to 0.4.

As already mentioned, the present invention also relates to the process for manufacturing articles, in particular plates, according to the invention, in which the enamel composition according to the invention is applied, preferably by screen printing, to the article of precursor glass (or mother glass or green glass) before ceramization, said composition being baked during the ceramization cycle and/or in which said composition is applied, preferably by screen printing, to the glass-ceramic article after ceramization, then said composition is baked.

When the baking of the enamel is carried out subsequently (after ceramization, this procedure also being known as a process with rebaking), said baking can in particular be carried out advantageously at a temperature that makes it possible to develop crystals in the enamel (where appropriate while modifying the interface, this temperature being chosen, for example, from the temperature range within which good coverage with the enamel and the formation of crystals are observed, this temperature range lying in particular between 700 and 900° C. for the enamels according to the invention, this temperature where appropriate being around 250° C. to 300° C. higher with respect to the dilatometric softening temperature of the enamel (or more precisely of the glass/of the glass frit forming the enamel), and preferably corresponding to (or being located just at or inside) the exothermic crystallization peak of the enamel. The enamel covering the substrate according to the invention is thus, where appropriate, crystallized after baking.

As a reminder, the manufacture of glass-ceramic plates generally takes place as follows: the glass, having a composition chosen for forming the glass-ceramic, is melted in a melting furnace, the molten glass is then rolled into a standard ribbon or sheet, by making the molten glass pass between rolling rolls, and the glass ribbon is cut to the desired dimensions. The plates thus cut are then ceramized in a manner known per se, the ceramization consisting in firing the plates with the thermal profile chosen to convert the glass into the polycrystalline material called "glass-ceramic", the expansion coefficient of which is zero or almost zero and which is resistant to a heat shock possibly ranging up to 700° C. The ceramization generally comprises a step of progressively raising the temperature up to the nucleation range, generally located in proximity to the glass conversion range, a step of passing through the nucleation range over several minutes, a further progressive rise in the temperature up to the ceramization hold temperature, the ceramization hold temperature being maintained for several minutes, followed by rapid cooling down to room temperature. Where appropriate, the process also includes a cutting operation (generally before ceramization), for example using a water jet, mechanical scoring using a scoring wheel, etc., followed by a fashioning operation (grinding, beveling, etc.).

In the process according to the invention, the composition described previously is deposited, either onto the glass precursor article or onto the glass-ceramic article obtained after ceramization, generally in the form of a paste, the deposition of the layer of composition preferably being carried out by screen printing (the deposition nevertheless being able to be carried out by another method if necessary), the thickness of the layer deposited (or wet film) being, for example, around a few microns (in particular less than or equal to 20 μm, and generally less than or equal to 10 μm). After depositing the composition, the coated article is generally dried (for example, via infrared heating or in an oven), generally at temperatures around 100-150° C., so as to evaporate the solvent (medium), fix the coating and allow the article to be handled, which results in a dry coating, then depending on the case, undergoes a conventional high-temperature ceramization cycle (especially as mentioned previously), the baking of the layer accompanying the conversion of the substrate, or undergoes a (re)baking at a temperature preferably located in the crystallization zone as explained previously, the baking time being adapted as a function of the chosen temperature (for example, longer if the temperature chosen is lower), the coating obtained then having a thickness generally around a few microns (generally between 1 and 10 μm, in particular from 2 to 3.5 μm). The process with (re)baking is generally preferred as it makes it possible to adapt the baking temperature in a more suitable manner as explained previously and it makes it possible to obtain better mechanical properties for the glass-ceramic articles according to the invention.

In one embodiment, the article according to the invention is based on a glass-ceramic of black appearance, having a low light transmission of less than 5% (such as the plates sold under the name Kerablack by Eurokera) coated with the layer of enamel according to the invention, for example is based on glass-ceramics refined with arsenic having a composition as described in patent application EP 0 437 228 or U.S. Pat. No. 5,070,045 or FR 2 657 079.

Preferably, the article according to the invention is based on a glass-ceramic having a content of arsenic oxide (expressed as $As_2O_3$) of less than 0.2%, in particular of less than 0.1%, especially of less than or equal to 500 ppm, or even zero, for example is based on glass ceramics having a composition as described in patent application WO 2012/156444 (these glass-ceramics being of black appearance, having a low light transmission, in particular of less than 5%, preferably between 0.8 and 2%, and being refined with tin).

The article according to the invention may also be of a light color, based on a transparent (such as the plates sold under the name KeraLite by Eurokera and Keraglass) or a translucent glass-ceramic (such as the plates sold under the name Kerawhite, Kerabiscuit or Keravanilla by Eurokera), coated with the layer of enamel according to the invention, said layer possibly being of decorative and/or functional use (for example, possibly being intended for masking, at least partly, the underlying elements when they are not in use, such as heating elements and possible displays, while still allowing the heating elements and possible displays to be detected when they are in use).

When the article according to the invention is a plate, said plate may, where appropriate, comprise reliefs and/or hollows and/or it may be provided (or associated) with one or more additional functional or decorative elements (frame, connector(s), cable(s), control element(s), display(s), for example what are called "7-segment" light-emitting diode displays or liquid crystal displays, electronic control panel with touch-sensitive controls and digital display, etc.). The plate according to the invention may be mounted on an appliance, inside which the one or more heating elements are placed, where appropriate without an intermediate complex with the aim of masking the interior of the apparatus from the user's view.

The invention also relates to the high-temperature-maintaining and/or cooking appliances (or devices) that include at least one substrate (plate or door) according to the invention (for example cookers, built-in cooktops, ovens, etc.). The invention covers both cooking appliances having a single plate and appliances having several plates, each of these plates having, where appropriate, a single heater or multiple heaters. The term "heater" is understood to mean a cooking location. The invention also relates to hybrid cooking appliances, the hob(s) of which has (have) several types of heater. Furthermore, the invention is not limited to the manufacture of hobs for cookers or cooktops. The plates manufactured according to the invention may, as described above, also be other plates (chimney inserts, fire screens, etc.) that have to be very insensitive to temperature variations.

The examples which follow illustrate the results obtained with the glass-ceramic articles and enamels according to the invention (examples 1 to 4) in comparison with reference examples relating to different previous glass-ceramic articles and enamels (reference examples 1 to 4).

In these examples, a glass-ceramic plate, one face of which is smooth (that which must receive the enamel layer in the form of millimetric random patterns) and the other face of which has evenly distributed spikes (with a height of 80 μm and an elliptical circumference of 1.65/1.5 mm), is manufactured from a glass having a composition indicated in each example.

This glass was melted at around 1600-1750° C. in an amount such that a glass ribbon was able to be rolled, from which ribbon glass plates with final dimensions of 56.5 cm×56.5 cm×0.4 cm were cut.

The plates were coated by screen printing on their upper face with a composition, in the form of a screen-printable stable enamel (based on a powder having the composition specified in each example, the powder being made into a paste in a medium based on acrylic resin and on pine oil sold under the reference MX54 by Ferro for the purpose of depositing it onto the plate, and said medium being consumed at the latest during the baking of the enamel) using conventional polyester or polyamide fabrics, then dried at around 100-150° C.

The plates (green class or mother glass) coated with enamel were then ceramized on ceramic trays according to a cycle as described in patent application FR 2 657 079 (for glass-ceramics refined with arsenic) or in application WO 2012156444 (for glass-ceramics not refined with arsenic/glass-ceramics refined with tin).

Glass-ceramic plates coated with a layer of enamel were obtained, the thickness of the layer of enamel after baking being around 2.5 μm. These plates were cut to form 70 mm×70 mm test specimens, which were analyzed in terms of mechanical strength by measuring their scale factor (expressed in MPa) and also their Weibull modulus by means of a ring-on-tripod bending test, the results being interpreted using the Weibull model, as described previously in the present text, the decorated surface being in extension. The delamination strength of the enamel is also evaluated as described previously in the present text, using an adhesive tape sold under the reference Transparent Tape 550 by 3M.

REFERENCE EXAMPLE 1

In this first reference example, the glass-ceramic plate was manufactured from a glass having a composition according to patent application FR 2 657 079 (conventional glass-ceramic refined with arsenic), this comprising, as weight percentages, the following oxides:

| | |
|---|---|
| $SiO_2$ | 69.44 |
| $Al_2O_3$ | 18.9 |
| $Li_2O$ | 3.3 |
| MgO | 0.9 |
| ZnO | 1.55 |
| BaO | 0.75 |
| $K_2O$ | 0.1 |
| $TiO_2$ | 2.6 |
| $ZrO_2$ | 1.75 |
| $As_2O_3$ | 0.51 |
| $Na_2O$ | 0.2 |

The enamel used was a conventional enamel based on a powder comprising 90% by weight of a glass frit having the following composition: $SiO_2$: 48.6%; MgO: 3.8%; $Na_2O$: 2.6%; $K_2O$: 3.3%; $Li_2O$: 1.3%; CaO: 0.6%; BaO: 17.8%; $Al_2O_3$: 7.1%; $ZrO_2$: 1.7%; ZnO: 8%; $B_2O_3$: 5.4% and 10% by weight of a pigment based on iron, copper and chromium oxides. The scale factor measured was around 88 MPa, the Weibull modulus (which reveals the dispersion of the results, the results being less dispersed as the modulus increases) being equal to 13.7. The delamination strength grade was 0. The expansion coefficient of the glass frit/enamel (between 20 and 400° C., this coefficient being calculated from the Appen model described in the work *Glass—Nature, Structure and Properties*, H. Scholze, Springer-Verlag, 1991) was $74 \times 10^{-7}$ $K^{-1}$.

REFERENCE EXAMPLE 2

In this second reference example, the procedure was the same as in reference example 1, the enamel being replaced with an improved enamel having a reinforcing effect, this enamel being based on a powder comprising 100% by weight of an alumina-free glass frit having the following composition: $SiO_2$: 60.5%; MgO: 4%; $Na_2O$: 9.5%; $Li_2O$: 5%; BaO: 10%; $ZrO_2$: 2%; ZnO: 4%; $B_2O_3$: 5%. The scale factor obtained was around 180 MPa (with a standard deviation of 3.2 MPa), the Weibull modulus being equal to 27 MPa. The delamination strength grade was 3. The expansion coefficient of the glass frit/enamel was $99 \times 10^{-7}$ $K^{-1}$.

Compared with reference example 1, a strengthening of the glass-ceramic refined with arsenic was observed but a deterioration in the delamination strength was also observed.

REFERENCE EXAMPLE 3

In this third reference example, the procedure was the same as in reference example 1, the glass-ceramic being replaced with a glass-ceramic manufactured from a glass not refined with arsenic having a composition comprising, as weight percentages, the following oxides:

| | |
|---|---|
| $SiO_2$ | 64.8 |
| $Al_2O_3$ | 20.76 |
| $Li_2O$ | 3.85 |
| MgO | 0.48 |
| ZnO | 1.5 |
| BaO | 2.5 |
| $K_2O$ | 0.2 |
| $TiO_2$ | 3.0 |
| $ZrO_2$ | 1.3 |
| CaO | 0.5 |
| $As_2O_3$ | 0.05 |
| $Na_2O$ | 0.6 |
| $SnO_2$ | 0.3 |
| $V_2O_5$ | 0.04 |
| $Cr_2O_3$ | 0.02 |
| $Fe_2O_3$ | 0.1 |

The scale factor measured was of around 59 MPa, the Weibull modulus being equal to 21.2. The delamination strength grade was 0. The expansion coefficient of the glass frit/enamel was $74 \times 10^{-7}$ $K^{-1}$.

A strong deterioration in the mechanical strength of the glass-ceramic not refined with arsenic and coated with the conventional enamel was observed, the delamination strength remaining satisfactory.

REFERENCE EXAMPLE 4

In this fourth reference example, the procedure was the same as in reference example 3, the enamel being replaced with an enamel formed of 90% of the frit of reference example 2 and of 10% of the pigment of example 1. The scale factor measured was of around 106 MPa, the Weibull modulus being equal to 13.3. The delamination strength grade was 2. The expansion coefficient of the glass frit/enamel was $99 \times 10^{-7}$ $K^{-1}$.

A deterioration in the mechanical strength of the glass-ceramic not refined with arsenic and coated with this conventional enamel, compared with that obtained with a glass-ceramic refined with arsenic, was observed, the delamination strength remaining weak.

EXAMPLE 1

In this first example according to the invention, the procedure was the same as in reference example 3, the frit of the enamel being replaced with a frit according to the invention having the following composition: $SiO_2$: 54.5%; MgO: 4%; $Na_2O$: 9.5%; $Li_2O$: 2%; BaO: 10%; $ZrO_2$: 1%; ZnO: 4%; $B_2O_3$: 5%; $Al_2O_3$: 10%. The scale factor obtained was of around 85 MPa, the Weibull modulus being equal to 12.3. The delamination strength grade was 0. The expansion coefficient of the glass frit/enamel was $84 \times 10^{-7}$ $K^{-1}$.

It was observed that the mechanical strength of the glass-ceramic not refined with arsenic and coated with the enamel according to the invention is at least maintained at the level of that normally obtained with the conventional glass-ceramics refined with arsenic, whereas it falls much more strongly when the conventional enamels are used, the delamination strength being at the same time improved compared with that obtained using compositions which make it possible to retain a good mechanical strength.

EXAMPLE 2

In this second example according to the invention, the procedure was the same as in example 1, the frit of the enamel being replaced with the frit according to the invention having the following composition: $SiO_2$: 56.5%; MgO: 4%; $Na_2O$: 9.5%; $Li_2O$: 2%; BaO: 10%; $ZrO_2$: 2%; ZnO: 4%; $B_2O_3$: 5%; $Al_2O_3$: 7%. The scale factor obtained was of around 85 MPa, the Weibull modulus being equal to 11.5. The delamination strength grade was 0. The expansion coefficient of the glass frit/enamel was $85 \times 10^{-7}$ $K^{-1}$.

It is here again observed that the mechanical strength of the glass-ceramic not refined with arsenic and coated with the enamel according to the invention is at least maintained at the level of that normally obtained with the conventional glass-ceramics refined with arsenic, whereas it falls much more strongly when the conventional enamels are used, the delamination strength being at the same time improved compared with that obtained using compositions which make it possible to retain a good mechanical strength.

EXAMPLE 3

In this third example according to the invention, the procedure was the same as in example 1, the frit of the enamel being replaced with a frit according to the invention having the following composition: $SiO_2$: 57.5%; MgO: 4%; $Na_2O$: 9.5%; $Li_2O$: 2%; BaO: 10%; $ZrO_2$: 1%; ZnO: 4%; $B_2O_3$: 5%; $Al_2O_3$: 7%. The scale factor obtained was of around 93 MPa, the Weibull modulus being equal to 15. The delamination strength grade was 0. The expansion coefficient of the glass frit/enamel was $85 \times 10^{-7}$ $K^{-1}$.

It is here again observed that the mechanical strength of the glass-ceramic not refined with arsenic and coated with the enamel according to the invention is at least maintained at the level of that (or even greater than that, as in the present case) normally obtained with the conventional glass-ceramics refined with arsenic, whereas it falls much more strongly when the conventional enamels are used, the delamination strength being at the same time improved compared with that obtained using compositions which make it possible to retain a good mechanical strength.

EXAMPLE 4

In this fourth example according to the invention, the procedure was the same as in example 2 but this time including an additional step of milling the frit/pigments assembly so as to achieve an average diameter D90 of the particles of the enamel of around 4.7 µm. The scale factor of the enameled plates obtained after application of the enamel to and baking of the enamel on the glass-ceramic was of around 120 MPa, the Weibull modulus being equal to 9.7. The delamination strength grade was 1. The expansion coefficient of the glass frit/enamel was $85 \times 10^{-7}$ $K^{-1}$.

An additional improvement is observed in the mechanical strength of the glass-ceramic not refined with arsenic obtained according to the present example compared with that observed above, the delamination strength at the same time remaining improved compared with that obtained by using other compositions which make it possible to obtain a good mechanical strength.

The plates according to the invention may especially be used advantageously to produce a new range of hobs for cookers or cooktops, or for producing elements of a wall or walls (for example doors) for ovens, or for producing chimney inserts or fire screens, etc.

The invention claimed is:

1. A glass-ceramic article at least partly coated with at least one layer of an enamel formed from a glass frit having the following composition:

| | |
|---|---|
| $SiO_2$ | 50-66% by weight; |
| MgO | 3-8% by weight; |
| $Na_2O$ | 7-15% by weight; |
| $K_2O$ | ≤3% by weight; |
| $Li_2O$ | ≤3% by weight; |
| CaO | ≤1% by weight; |
| BaO | 7-15% by weight; |
| $Al_2O_3$ | >3-20% by weight; |
| $ZrO_2$ | 0-4% by weight; |
| ZnO | >0-5% by weight; and |
| $B_2O_3$ | >0-6% by weight, | wherein:
a sum of alkaline-earth metal oxides CaO+BaO is between 8 and 15% by weight; and
a sum of alkali metal oxides $Na_2O+K_2O+Li_2O$ is between 7 and 20% by weight.

2. The glass-ceramic article of claim 1, wherein the glass frit comprises more than 4% by weight of alumina $Al_2O_3$.

3. The glass-ceramic article of claim 1, wherein the glass frit comprises at least one of
more than 7% by weight of $Na_2O$, and
less than 13% by weight of BaO.

4. The glass-ceramic article of claim 1, wherein the glass frit comprises at most 2% by weight of $Li_2O$.

5. The glass-ceramic article of claim 1, wherein the article is formed from a glass-ceramic comprising less than 0.2% by weight of arsenic oxides.

6. The glass-ceramic article of claim 1, wherein the article is coated with the at least one layer of enamel on at least one part of its upper face.

7. A device for baking or for maintaining a high temperature, the device comprising the glass-ceramic article of claim 1 and one or more heating elements.

8. The glass-ceramic article of claim 1, wherein the glass frit comprises more than 5% by weight of alumina $Al_2O_3$.

9. The glass-ceramic article of claim 1, wherein the glass frit comprises more than 7% by weight of alumina $Al_2O_3$.

* * * * *